(12) United States Patent
Commons et al.

(10) Patent No.: US 10,129,098 B2
(45) Date of Patent: Nov. 13, 2018

(54) NETWORKED DEVICE RESOURCE ENUMERATION

(71) Applicant: Microsoft Technology Licensing, LLC, Redmond, WA (US)

(72) Inventors: Daniel Commons, Woodinville, WA (US); Todd Rawlings, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 268 days.

(21) Appl. No.: 14/671,594

(22) Filed: Mar. 27, 2015

(65) Prior Publication Data

US 2016/0285779 A1 Sep. 29, 2016

(51) Int. Cl.
  *H04L 12/24* (2006.01)
  *G06F 21/57* (2013.01)
  *G06F 11/30* (2006.01)
  *H04L 29/06* (2006.01)

(52) U.S. Cl.
  CPC .......... *H04L 41/28* (2013.01); *G06F 11/3006* (2013.01); *G06F 21/577* (2013.01); *H04L 63/0272* (2013.01)

(58) Field of Classification Search
  CPC ... G06Q 10/06; H04L 47/827; H04L 67/1012; G06F 9/50
  See application file for complete search history.

(56) References Cited

U.S. PATENT DOCUMENTS

| | | | |
|---|---|---|---|
| 7,529,775 B2 | 5/2009 | Bluvshteyn et al. | |
| 7,676,565 B2 | 3/2010 | Marl et al. | |
| 8,429,256 B2 | 4/2013 | Vidal et al. | |
| 8,689,325 B2 | 4/2014 | Kester et al. | |
| 8,811,970 B2 | 8/2014 | Danford et al. | |
| 9,075,788 B1* | 7/2015 | Roth | G06F 11/3006 |
| 2003/0083998 A1 | 5/2003 | Ramachandran et al. | |
| 2006/0130120 A1* | 6/2006 | Brandyberry | H04N 7/17309 725/136 |
| 2007/0011683 A1* | 1/2007 | Helander | G06F 9/4887 718/104 |
| 2007/0244987 A1* | 10/2007 | Pedersen | H04L 63/0272 709/217 |

(Continued)

FOREIGN PATENT DOCUMENTS

WO   2002005184 A3   10/2003

OTHER PUBLICATIONS

"Integrity Software License Agreement for Softrack Software", Published on: Aug. 11, 2003 Available at: http://www.softwaremetering.com/outgoing/stnw_manual.pdf.

(Continued)

*Primary Examiner* — Barbara B Anyan (74) *Attorney, Agent, or Firm* — International IP Law Group, PLLC (57) ABSTRACT

Various systems and methods for device resource enumeration are described herein. In one example, an enumeration module may include logic executable at a networked device. The enumeration module may be configured to enumerate resources of the networked device without dependency on write permissions to a file system of the networked device, and generate a data object stored in a memory unit of the networked device based on the enumerated resources.

15 Claims, 5 Drawing Sheets

(56) References Cited

U.S. PATENT DOCUMENTS

| | | |
|---|---|---|
| 2010/0088197 A1 | 4/2010 | Dehaan et al. |
| 2011/0238710 A1 | 9/2011 | Barritz et al. |
| 2011/0296393 A1 | 12/2011 | Vidal et al. |
| 2014/0143538 A1 | 5/2014 | Lindteigen |
| 2015/0095940 A1* | 4/2015 | Redmann ......... H04N 21/25825 725/32 |
| 2016/0078234 A1* | 3/2016 | Li ........................ G06F 21/577 726/25 |

OTHER PUBLICATIONS

Singh, et al., "Puzzle Fast Random Bit Encryption Technique for Joint Video Compression and Encryption", In Journal of Theoretical and Applied Information Technology, vol. 41, No. 1Jul. 15, 2012, pp. 45-50.

Robinson, Daniel, "Res Software Offers Free Cloud-Based It Audit Tool", Published on: Jul. 18, 2011, Available at: http://www.v3.co.uk/v3-uk/news/2094495/res-software-offers-free-cloud-audit-tool.

Natarajan, et al., "A Novel Approach for Data Security Enhancement Using Multi Level Encryption Scheme tuning", In International Journal of Computer Science and Information Technologies, vol. 2, Mar. 2011, pp. 469-473.

"About Inventory Performance Tuning", Published on: Apr. 19, 2011, Available at: http://www.symantec.com/business/support/index?page=content&id=HOWTO50114.

* cited by examiner

NETWORKED DEVICE RESOURCE ENUMERATION

BACKGROUND

As network connectivity between computing devices increases, detailing what resources are provided on a given networked device may be increasingly difficult. For example, a networked computing environment may include software installed on one or more computing devices within the networked computing devices. Licenses associated with various software applications may include multiple levels of use rights, access levels, time periods associated with a given license, and the like. In some scenarios, networked computing systems include various device components that may be provided from third party vendors. In this scenario, magnitude of a given networked computing systems may increase a cost associated with enumerating inventory for each component included installed on every networked computing device in the system.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a method for device resource enumeration. The method can include enumerating, via an enumeration module, resources of a networked device without dependency on write permissions to a file system of a networked device. The method may also include generating a data object stored in a memory unit of the networked device based on the enumerated resources, wherein the generated object includes a plurality of delimited represented in a single file.

Another embodiment provides one or more computer-readable storage media for projecting a remote object. The computer-readable storage media can include a plurality of instructions that, when executed by a processor, cause the processor to enumerate resources of a networked device without dependency on write permissions to a file system of the networked device. The instructions can also cause the processor to generate a data object stored in a memory unit of the networked device based on the enumerated resources, wherein the generated object comprises a plurality of delimited sections represented in a single file. Furthermore, the instructions can cause the processor to compress the object via a compression module embedded in the enumeration module, encrypt the compressed object, and transmit the encrypted and compressed object to a destination device, wherein no two way communication is enabled for communication of the destination device back to the enumeration module.

Another embodiment provides a system for device resource enumeration. The system can include an enumeration module comprising logic, at least partially comprising hardware logic, executable at a networked device. The logic may be configured to enumerate resources of the networked device without dependency on write permissions to a file system of the networked device. The logic may also be configured to generate a data object stored in a memory unit of the networked device based on the enumerated resources.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Techniques for device resource enumeration are described herein. As discussed above, in networked computing systems, auditing of individual networked computing devices may be difficult. In some cases, manual inspection may be required involving temporarily disabling a given networked computing device potentially disrupting service in a networked computing systems. In some cases, inventory enumeration may require system administrator access rights further increasing a difficulty associated with gathering inventory data. Further, as business scenarios rely increasingly on networked computing systems, logical and physical dimension data related to networked computing devices may vary widely in terms of capabilities and restraints.

The techniques described herein include a lightweight executable module local to each computing device in a given networked computing system. The term, "lightweight" as referred to herein at least includes a module that does not depend on file system access to a computing device at which it is configured to gather inventory data. For example, the lightweight executable module may not have write access to the file system of a monitored computing device, and may only write to temporary non-persistent memory. Further, the term lightweight may also include a feature of an executable module that is configured to throttle operation in order to reduce operation performance degradation of components of the computing device such as software applications, hardware components, and the like. The term lightweight may also refer to a feature of the executable module wherein an output data object is human-readable text after machine readable decompression and decryption is performed. In other words, the lightweight executable module may be configured to generate relatively simple string data objects compared to heavier rich data objects other than string data objects.

As discussed in more detail below, the lightweight executable module may be referred to herein as an enumeration module. The enumeration module may generate a data object in-memory. The data object may be compressed and encrypted for durable transport across networks including non-secure network paths. For example, the compressed and encrypted data object may be durable such that transport across non-secure network paths may be used when other paths are not available with a reduced risk of exposing private or confidential enumeration detail. In other words, the techniques described herein increase a reliability of receiving the compressed and encrypted data object at a central analysis service or device. The lightweight executable may be useful in any networked device configuration. For example, the lightweight executable may be configured to perform operations in an Internet of Things (IoT) environment wherein networked devices may have relatively limited resources for device enumeration including status reporting and the like.

Figure 1:
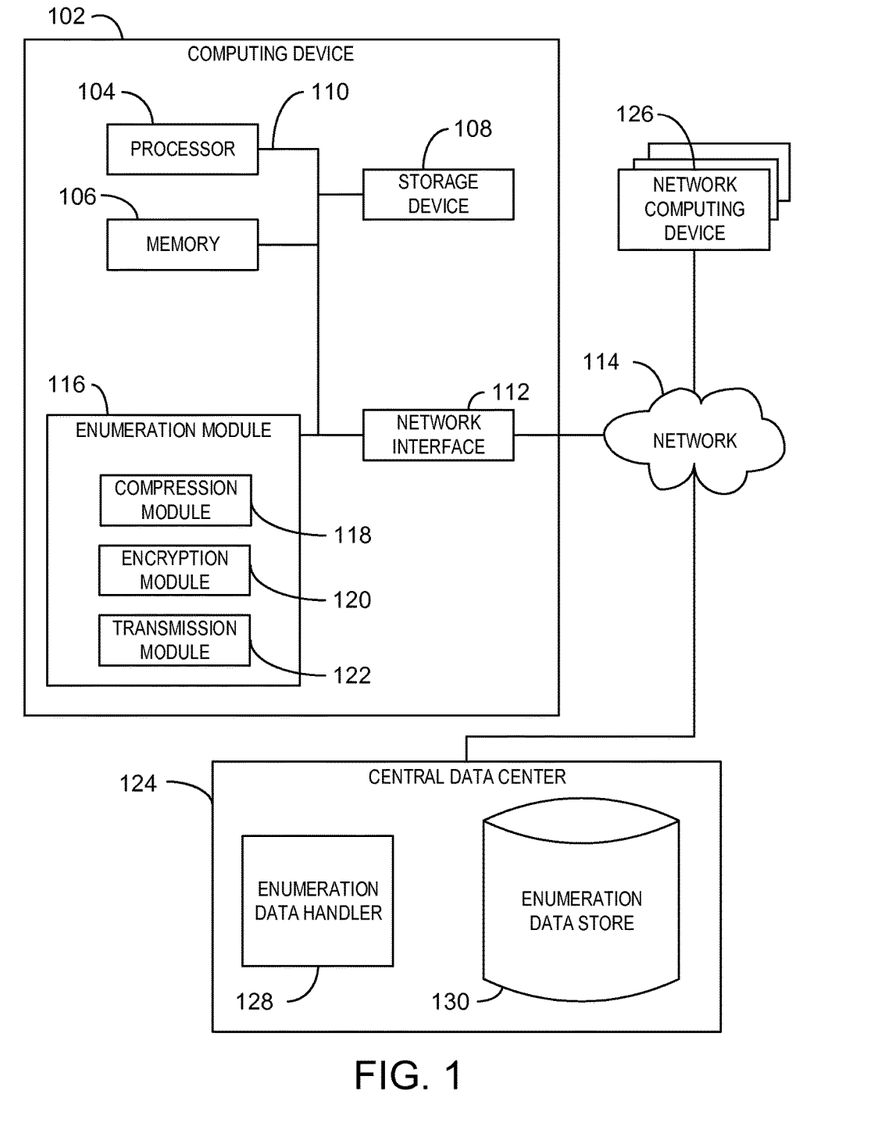
FIG. 1 is a block diagram of an example of a computing system configured to provide enumeration data of a networked device environment.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, physical electronic circuits, and the like, or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Computer-readable storage media does not include all implementations of computer-readable media generally, such as signals per se. Therefore, in contrast, computer-readable media generally (i.e., not computer-readable storage media) may additionally include communication media such as transmission media for wireless signals and the like.

FIG. 1 is a block diagram of an example of a computing system configured to provide enumeration data of a networked device environment. The computing system 100 may include a computing device 102. The computing device 102 may be, for example, a mobile phone, laptop computer, desktop computer, or tablet computer, among others. The computing device 102 may include a processor 104 that is adapted to execute stored instructions, as well as a memory unit 106 that stores instructions that are executable by the processor 102. The memory unit 106 may be non-persistent memory in relation to a storage device 108 that may include a hard disk drive for example. The processor 104 can be a single core processor, a multi-core processor, a computing cluster, or any number of other configurations. The memory unit 106 can include random access memory (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.)), flash memory, or any other suitable memory systems. The instructions that are executed by the processor 104 may be used to device resource enumeration.

The processor 104 may be connected through a system bus 110 (e.g., PCI, ISA, PCI-Express, NuBus, etc.) to network interface 116 may also be adapted to connect the computing system 100 through the system bus 106 to a network 114.

The storage 108 can include a hard drive, an optical drive, a USB flash drive, an array of drives, or any combinations thereof. An enumeration module 116 may be, in some cases, executable instructions to be stored in the storage device 108. In some cases, the enumeration module 116 may be implemented as logic, at least partially comprising hardware logic. The enumeration module 116 may include submodules including a compression module 118, an encryption module 120, and a transmission module 122. Although FIG. 1 illustrates each of the modules 118, 120, and 122 as being submodules of the enumeration module 116, each of the modules 116, 118, 120, and 122 may be implemented as discrete components, or as components of a broader process, or logical hardware construct.

The enumeration module 116 is configured to enumerate resources of the networked device without dependency on write permissions to a file system of the networked device, and generate a data object stored in a memory unit of the networked device based on the enumerated resources. In other words, the enumeration module 116 may be configured to generate the data object without write access to a file system of the computing device 102. In some cases, the enumeration module 116 may be implemented without write access, and may be configured to provide only one-way communication over the network 114 to a central data center 116 wherein the compressed and encrypted data object may be decrypted, decompressed, and analyzed as discussed in more detail below. Being configured to have only one-way access to the central data center 124 may reduce any back-door security threat potential that may otherwise enable malicious or even unintended access to the enumeration module 116. Further, in some cases, enumeration provided by the enumeration module 116 may be throttled. For example, depending on a given application being run on the computing device 102, the enumeration module 116 may delay enumeration of resources over a period of time such that performance of any other operation or application may not be influenced. In other words, the enumeration module 116 may be configured to be undetectable in regards to performance degradation that may be caused by an increased load related to enumeration operations.

In any case, the enumeration module 116 may be configured to generate a data object stored in a memory unit, such as the memory unit 106, of the computing device 102 based on the enumerated resources. The enumerated resources may include any number of resource variations. For example, the enumeration module 116 may be configured to identify, inventory, gather, or otherwise determine installed software packages, hardware components, licenses associated with installed software, updates to hardware components, and the like.

The data object stored in the memory unit 106 may include a delimited list. The data object may include multiple delimited sections embedded into a single file. The multiple sections of enumerated data may be extracted out as separate delimited files, but may require more data redundancy to use any of these delimited files on their own. Accordingly, a first section of the delimited sections may be a root section, while other sections relate to the root, such as in a star schema in data architectures. The multiple delimited lists may each related to different classes of enumeration information. For example, each delimited list may relate to performance, network operations, users associated with the computing device 102, administrators associated with e computing device 102, installed software, hard disk drives of the computing device 102, processors installed in the computing device 102, memory installed in the computing device 102, and the like. Further, in some cases the computing device 102 may be implemented as a virtual machine wherein each of the delimited lists may be related to classes of enumeration information associated with the virtual machine.

The enumeration module 116 may be deployed upon operation of one or more external operations provided via the central data center 124. For example, the central data center 124 may run a structured language query (SQL) to interrogate the computing device 102. Upon deployment of the SQL, the enumeration module 116 may be initiated. In some cases, the enumeration module 116 may be embedded into an operating system (OS) of the computing device 102. In this scenario, an OS may initiate operations of the enumeration module 116. In any case, the enumeration module 116 may be configured to deploy after predetermined configurable time periods. For example, in some cases the enumeration module 116 may be configured to deploy once a day.

Once the enumeration module 116 has generated the data object related to the enumeration data, the compression module 118 may be configured to compress the data object. The compressed data object may then be encrypted via the encryption module 120. As discussed in more detail below in regard to FIG. 2, the encryption module 120 may include a two part process of synchronous encryption such as Advanced Encryption Standard (AES), as well as asynchronous encryption such as RSA (publically described in 197 by Rivset, Shamir, and Adlemen). Other encryption methods of both synchronous and asynchronous encryption are contemplated.

The computing system 100 may include other networked devices, such as one or more networked computing devices 126. The networked computing devices 126 may be implemented similar to the computing device 102 and may include an enumeration module, such as the enumeration module 116 local to each device. Enumeration data in compressed and encrypted format may be provided to the central data center 124 for analysis by an enumeration data handler 126. The enumeration data handler 128 may be implemented as logic, at least partially including hardware logic, software, firmware, or any combination thereof. The enumeration data handler 128 may be configured to decrypt and decompress the enumeration data, as well as decompose the combined delimited file into dimensions of data associated with each of the multiple delimited files in the combined delimited file. Data may be stored in a central data store, such as the enumeration data store 120 of the central data center 124. As discussed in more detail below, the enumeration data provided to the central data center 124 may be used to update current or previously known inventory data based on a change in enumeration data objects received.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the calibration module 120, detection module 122, environment module 124, and projection module 126 may be partially, or entirely, implemented in hardware and/or in the processor 102. For example, the functionality may be implemented with an application specific integrated circuit, in logic implemented in the processor 102, or in any other device.

Figure 2:
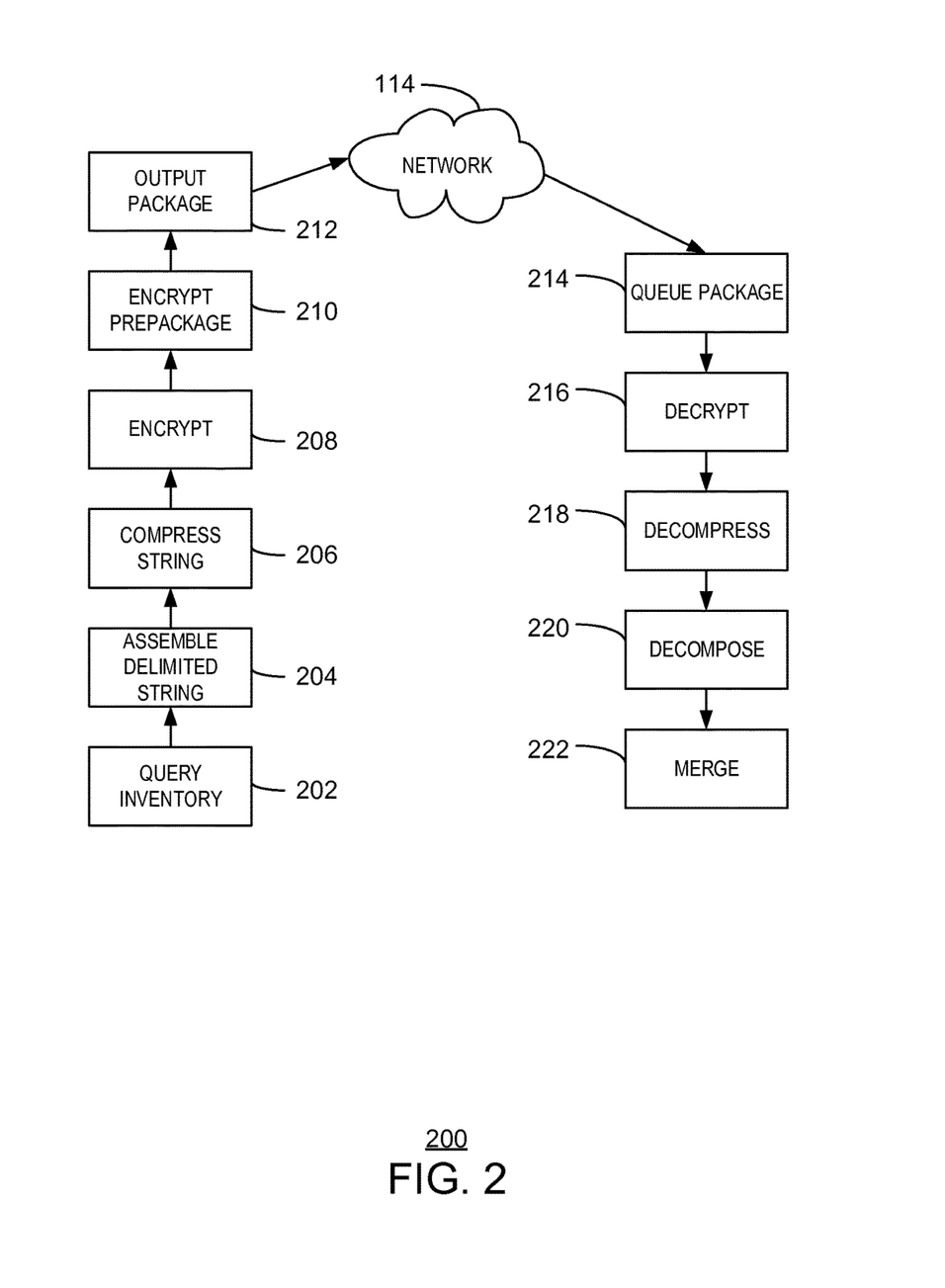
FIG. 2 is a process flow diagram of an example process for enumerating resources of a networked device.

FIG. 2 is a process flow diagram of an example process for enumerating resources of a networked device. At block 202, inventory data may be queried locally at a networked computing device, such as the computing device 102 of FIG. 1. Querying inventory data may include enumeration of resources of the networked device without dependency on write permissions to a file system of the computing device 102. As discussed above, enumeration may be throttled based on available resource bandwidth of the computing device 102 such that enumeration may be undetectable in terms of reduced performance of other active processes and operations of hardware, software, and the like.

At block 204, a delimited string may be assembled. Assembly of the delimited string may include generating a data object stored in a memory unit, such as the memory unit 106 of the computing device 102 based on the enumerated resources queried at block 202. At block 206 the data object may be compressed, and at block 208 the compressed data object may be encrypted.

Encrypting at block 208 may be a synchronous encryption, such as AES encryption discussed above in regard to FIG. 1. The synchronous encryption 208 my use a dynamically generated key an initialization vector as well as a computed hash value of encrypted bytes. At block 210, asynchronous encryption may be performed on the computed hash value, the dynamically generated key, and initialization vector. The encryption 210 may be packaged as a prepackage using an embedded public key of a destination device, such as a device associated with the central data center 124 of FIG. 1. In some cases, if a temporary directory exists, a plain text, human-readable, file with the enumeration data may be created at the computing device 102.

The prepackage and a payload including computed hash value of encrypted bytes from the synchronous encryption 208 may be combined into an output file at block 212. The output file may be provided to a network, such as the network 114. In some cases, the network 114 may comprise one or more of the closest networked devices such as the networked computing devices 126. The enumeration module 114 of FIG. 1 may comprise a list of addresses for inboxes to potentially use as destination inboxes.

At block 214, the package as well as the prepackage may be queued. The queue at 214 may be configured to pull enumeration data objects from inboxes and queue them for decomposition. Beforehand, decryption including decryption of the prepackage and decryption of the payload package may be performed at 216. Further, the enumeration data object may be decompressed at 218. At 220, the assembled delimited string from block 204 may be decomposed. In other words, the combination of delimited files may be separated and decomposed to serialized text to be stored in relational database structure during a merge occurring at 222. Merging may include joining the enumeration data via SQL to an appropriate database.

In some cases, the decomposition at 220 may include decomposing into in-memory data tables in batches to increase throughput. Once a given number of packages are decomposed into the collection of data tables they may be passed to SQL during the merge 222. Each in-memory data table may be directly passed to SQL without any input/output overhead. For example, a data table dictionary may be assembled. The oldest package may be retrieved from the queue. The package may be exclusively locked, and the first 128 bytes of payload, RSA decrypt may be split off from the computed hash value associated with the synchronous encryption, as well as the key and vector. A second synchronous hash (SHA) may be computed to compare against the decrypted RSA hash. If hashes don't match, the package may be marked as suspect.

The payload may be decrypted using the initialization vector and key. Once the data has been decompressed the delimited and demarked enumeration object data may be parsed. For example, a data table may be targeted wherein a demarked value relates to a key in the dictionary. Decompression may be done in stages based on a batch size. Each data table having a dictionary with more than 0 rows may be sent to SQL, and, once committed to SQL the enumeration data object may be deleted. Further, the merge 222 may include runtime metrics configured to track performance, scalability, rate of change.

Figure 3:
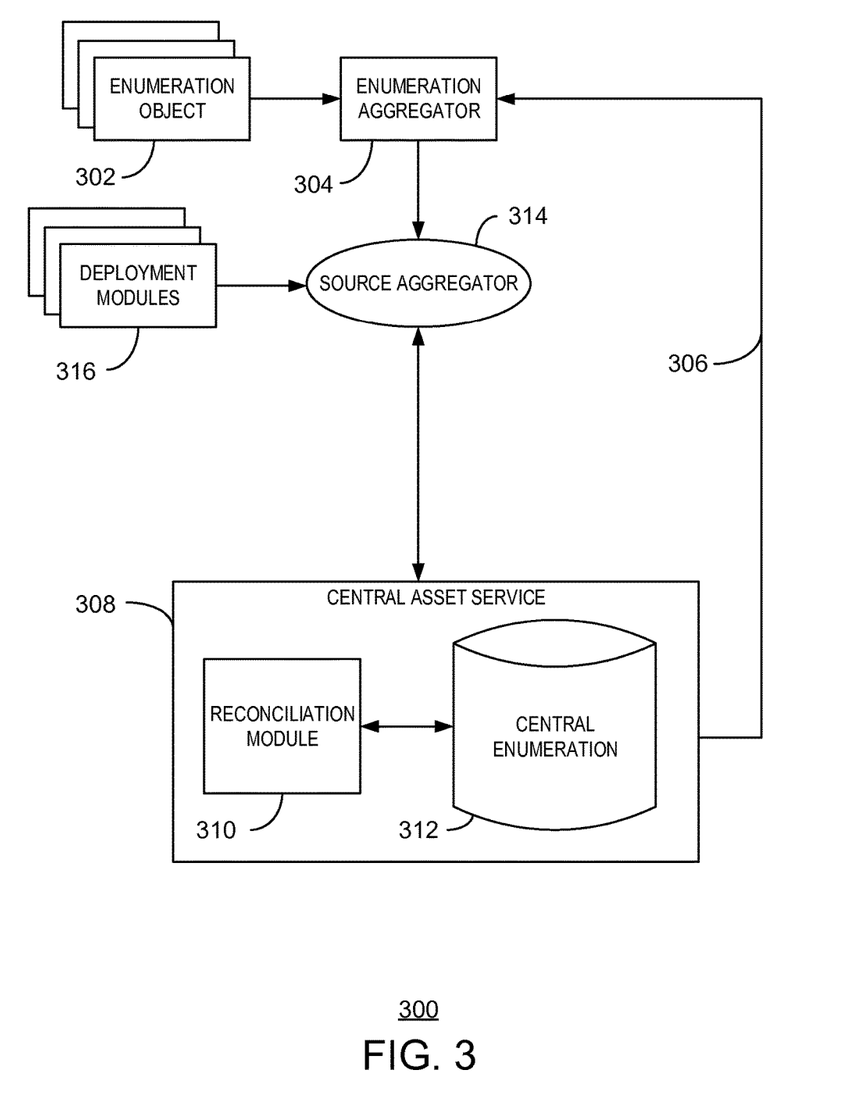
FIG. 3 is block diagram illustrating a process of reconciling enumeration data with a central asset service.

FIG. 3 is block diagram illustrating a process of reconciling enumeration data with a central asset service. The techniques described herein may provide a higher level of granularity in terms of resource enumeration than may otherwise be available at a centrally run enumeration process. In some cases, enumeration data received may be compared with enumeration data previously stored enumeration data, and updates may be provided based on any change of enumeration data. In FIG. 3, enumeration objects may be generated at 302.

The enumeration objects 302 may be enumeration data objects generated as discussed above in regard to FIG. 1 and FIG. 2 from one or more computing devices, such as the computing device 102, the networked computing devices 126, and the like. The enumerated objects at 302 may be passed to an enumeration aggregator 304. The enumeration aggregator 304 may be a data store, such as the enumeration data store 130 of FIG. 1, or may be a separate data store configured to temporarily store enumeration data. As indicated at 306, a central asset service 308 may be pointed to the enumeration aggregator 304. The central asset service 308 may be a central inventory system configured to receive enumeration data and reconcile enumeration data as the enumeration data changes via a reconciliation module 310. Differences, or changes in enumeration data may be provided to a central enumeration data store 312. The central enumeration data store 312. Additional tools, such as a source aggregator 314 may be used to receive updates from one or more deployment modules 316. Operations of the source aggregator 314 may provide updates based on reconciliation performed at the reconciliation module 310 and stored in the central enumeration data store 312 to various one or more deployment modules 316.

Figure 4:
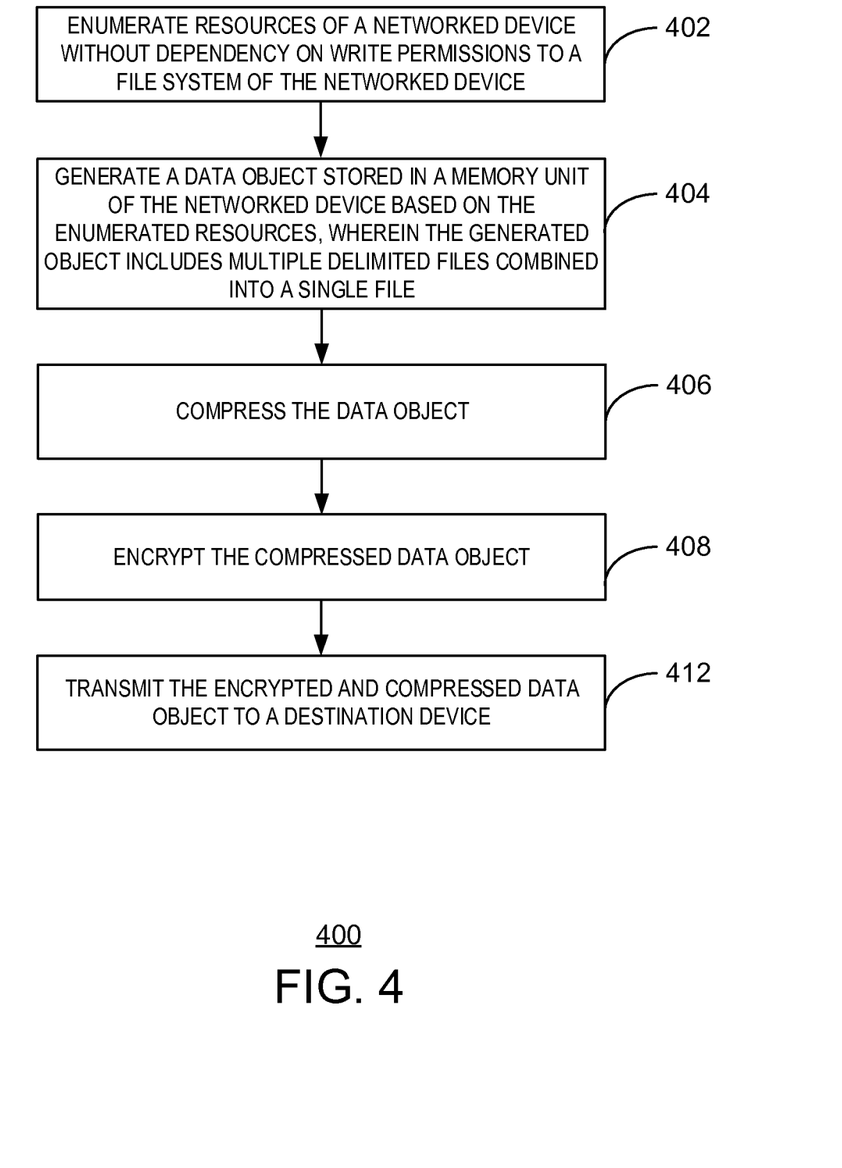
FIG. 4 is a block diagram illustrating a method of generating a data object associated with enumeration data.

FIG. 4 is a block diagram illustrating a method of generating a data object associated with enumeration data. At block 402, resources of a networked device may be enumerated. Enumeration may be performed without dependency on write permissions to a file system of the networked device. At block 404, data object is generated to be stored in a memory unit of the networked device based on the enumerated resources. The data object may be stored in non-persistent memory to avoid write permissions associated with the file system of the networked device. The generated object at 404 includes a multiple delimited sections represented in a single file.

In some embodiments, the data object may be compressed at 406. At block 408, the compressed data object may be encrypted. At 412, the encrypted and compressed data objected may be transmitted to destination device. The method 400 may be configured such that only one-way communication to the destination device may be enabled. This may reduce security risk that may otherwise occur if two-way communication was enabled. In other words, the method 400 may be implemented via a one-way only executable lightweight module, as discussed above, which is local to the networked device.

Figure 5:
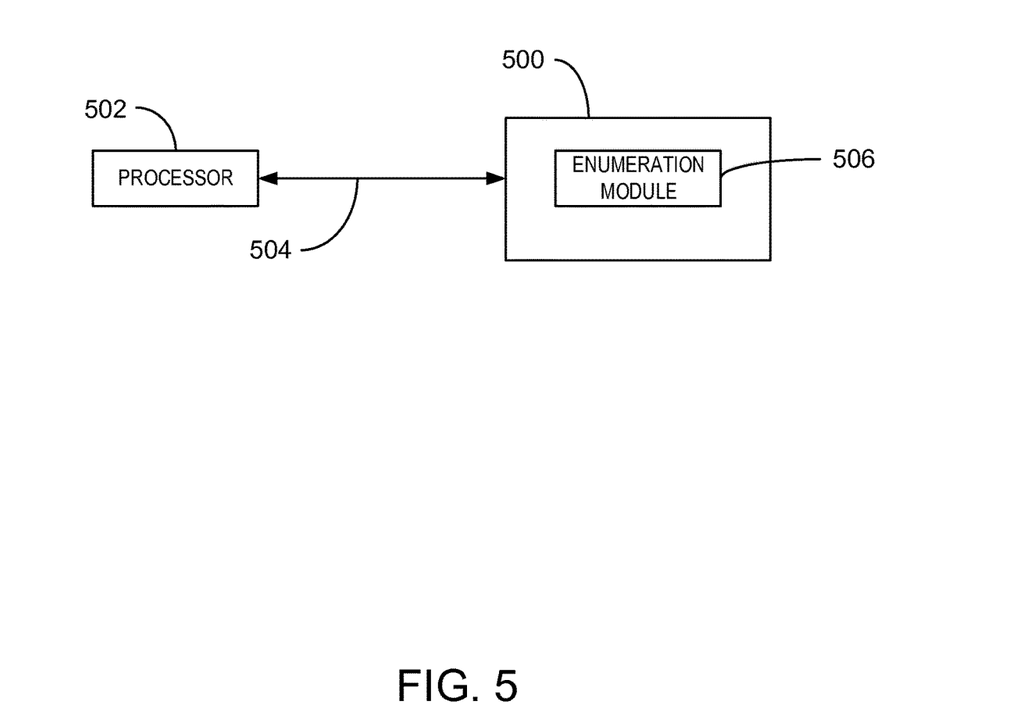
FIG. 5 is a block diagram of an example computer-readable storage media for enumerating resources.

FIG. 5 is a block diagram of an example computer-readable storage media for enumerating resources. The tangible, computer-readable storage media 500 may be accessed by a processor 502 over a computer bus 504. Furthermore, the tangible, computer-readable storage media 500 may include code to direct the processor 502 to perform the steps of the current method.

The various software components discussed herein may be stored on the tangible, computer-readable storage media 500, as indicated in FIG. 5. For example, the tangible computer-readable storage media 500 can include an enumeration application 506 for enumeration of resources of a networked device. For example, the calibration application 506 can enumerate resources of a networked device without dependency on write permissions to a file system of the networked device. The calibration application 506 can also generate a data object stored in a memory unit of the networked device based on the enumerated resources, wherein the generated object includes a plurality of delimited sections represented in a single file. The calibration application 506 can also generate a data object stored in a memory unit of the networked device based on the enumerated resources, wherein the generated object includes multiple delimited sections represented in a single file. The data may be compressed and encrypted. The encrypted and compressed data object may be transmitted to a destination device wherein no two way communication is enabled for communication of the destination device back to the enumeration application 506.

It is to be understood that any number of additional software components not shown in FIG. 5 may be included within the tangible, computer-readable storage media 500, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Example 1 is a system for device resource enumeration. The wireless charging device may include an enumeration module comprising logic, at least partially comprising hardware logic, executable at a networked device. The logic is configured to: enumerate resources of the networked device without dependency on write permissions to a file system of the networked device, and generate a data object stored in a memory unit of the networked device based on the enumerated resources.

Example 2 includes the system of example 1. This example includes a compression module embedded in the enumeration module to compress the data object.

Example 3 includes the system of any combination of examples 1-2. This example includes an encryption module to encrypt the compressed data object.

Example 4 includes the system of any combination of examples 1-3. The encryption may include a synchronous encryption based on a dynamic key and an initialization vector generated at run time of the encryption module, an asynchronous encryption of the initialization vector, dynamic key, and a payload hash associated with the asynchronous encryption. The asynchronous encryption is generated based on a public key associated with a destination device embedded into the encryption module.

Example 5 includes the system of any combination of examples 1-4. This example includes a transmission module to transmit the encrypted and compressed data object to a destination device.

Example 6 includes the system of any combination of examples 1-5. The system is configured as a transmit-only system wherein no two way communication with the system is enabled.

Example 7 includes the system of any combination of examples 1-6. The destination devices is configured to: receive the encrypted and compressed object, decrypt and decompress the encrypted and compressed object, decompress the compressed object, analyze the enumerated resources, determine any change in sequentially received generated objects, and update data of an inventory system associated with the networked device based on whether any change is determined.

Example 8 includes the system of any combination of examples 1-7. The enumeration module is to initiate enumeration of the resources of the networked device once every predefined time period. The predefined time period is based on the behavior of the resources being enumerated.

Example 9 includes the system of any combination of examples 1-8. The enumeration does not require administrator-level access rights.

Example 10 includes the system of any combination of examples 1-9. In this example enumeration of the resources may include capturing live usage of an application running at the networked device.

Example 11 includes the system of any combination of examples 1-10. The generated object may include a plurality of delimited sections represented in a single file.

Example 12 is a method for device resource enumeration. The wireless charging device may include enumerating, via an enumeration module, resources of a networked device without dependency on write permissions to a file system of a networked device, and generating, via the enumeration module, a data object stored in a memory unit of the networked device based on the enumerated resources. The generated object may include a plurality of delimited sections represented in a single file.

Example 13 includes the method of any combination of examples 11-12. This example includes compressing the data object via a compression module embedded in the enumeration module, encrypting the compressed data object, and transmitting the encrypted and compressed data object to a destination device. In this example no two way communication is enabled for communication of the destination device back to the enumeration module.

Example 14 includes the method of any combination of examples 11-13. The encryption may include a synchronous encryption based on a dynamic key and an initialization vector generated at run time of the enumeration module, an asynchronous encryption of the initialization vector, dynamic key, and a payload hash associated with the asynchronous encryption. The asynchronous encryption is generated based on a public key associated with a destination device embedded into the enumeration module.

Example 15 includes the method of any combination of examples 11-14. This example includes a destination device. The destination devices is configured to: receive the encrypted and compressed object, decrypt and decompress the encrypted and compressed object, decompress the compressed object, analyze the enumerated resources, determine any change in sequentially received generated objects, and update data of an inventory system associated with the networked device based on whether any change is determined.

Example 16 includes the system of any combination of examples 11-15, enumeration of the resources of the networked device is initiated once every predefined time period. The predefined time period is based on the behavior of the resources being enumerated.

Example 17 includes the system of any combination of examples 11-16. The enumeration does not require administrator-level access rights, and wherein enumerating of the resources may include capturing live usage of an application running at the networked device.

Example 18 includes one or more computer-readable storage media for device resource enumeration comprising a plurality of instructions that, when executed by a processor, cause the processor to: enumerate resources, via an enumeration application, of a networked device without dependency on write permissions to a file system of the networked device, generate a data object stored in a memory unit of the networked device based on the enumerated resources. The generated object may include a plurality of delimited sections represented in a single file, compress the data object via a compression module, encrypt the compressed data object, and transmit the encrypted and compressed object to a destination device. In this example no two way communication is enabled for communication of the destination device back to the enumeration module.

Example 19 includes the one or more computer-readable storage media of example 18. The enumeration does not require administrator-level access rights, and wherein enumerating of the resources may include capturing live usage of an application running at the networked device.

Example 20 includes the one or more computer-readable storage media of any combination of examples 18-19. In this example enumeration of the resources may include capturing live usage of an application running at the networked device.

What is claimed is:

1. A system for device resource enumeration, comprising:
a processor to:
enumerate resources of the networked device without dependency on write permissions to a file system of the networked device, wherein the enumerated resources comprise at least one license associated with an installed software package and at least one class of enumeration information associated with a virtual machine;
generate a data object stored in a memory unit of the networked device based on the enumerated resources, the generated data object comprising a plurality of delimited sections represented in a single file;
compress the data object via a compression technique;
encrypt the compressed data object using synchronous encryption based on a dynamic key and an initialization vector, wherein the initialization vector is generated at run time of an encryption technique; and
transmit the encrypted and compressed data object to a destination device without enabling two-way communication for transmitting data from the destination device back to the system.

2. The system of claim 1, wherein the encryption technique comprises:
an asynchronous encryption of the initialization vector, dynamic key, and a payload hash associated with the asynchronous encryption, wherein the asynchronous encryption is generated based on a public key associated with the destination device.

3. The system of claim 1, wherein the destination device is to:
receive the encrypted and compressed object;
decrypt and decompress the encrypted and compressed object;
decompress the compressed object;
analyze the enumerated resources;
determine any change in sequentially received generated objects; and
update data of an inventory system associated with the networked device based on whether any change is determined.

4. The system of claim 1, wherein the processor is to initiate enumeration of the resources of the networked device once every predefined time period, wherein the predefined time period is based on the behavior of the resources being enumerated.

5. The system of claim 1, wherein the enumeration does not require administrator-level access rights.

6. The system of claim 1, wherein enumeration of the resources comprises capturing live usage of an application running at the networked device.

7. The system of claim 1, wherein the data object comprises a root section and additional sections corresponding to the root section based on a star schema in a data architecture.

8. A method for device resource enumeration, comprising:
enumerating, via a processor, resources of a networked device without dependency on write permissions to a file system of a networked device, wherein the enumerated resources comprise at least one license associated with an installed software package and at least one class of enumeration information associated with a virtual machine;
generating, via the processor, a data object stored in a memory unit of the networked device based on the enumerated resources, wherein the generated data object comprises a plurality of delimited sections represented in a single file;
compressing, via the processor, the data object via a compression technique;
encrypting the compressed data object using synchronous encryption based on a dynamic key and an initialization vector, wherein the initialization vector is generated at run time of an encryption technique; and
transmitting the encrypted and compressed data object to a destination device without enabling two-way communication for transmitting data from the destination device back to the processor.

9. The method of claim 8, wherein the encryption technique comprises:
an asynchronous encryption of the initialization vector, dynamic key, and a payload hash associated with the asynchronous encryption, wherein the asynchronous encryption is generated based on a public key associated with the destination device.

10. The method of claim 9, wherein the destination devices is to:
receive the encrypted and compressed object;
decrypt and decompress the encrypted and compressed object;
decompress the compressed object;
analyze the enumerated resources;
determine any change in sequentially received generated objects; and
update data of an inventory system associated with the networked device based on whether any change is determined.

11. The method of claim 8, wherein enumeration of the resources of the networked device is initiated once every predefined time period, and wherein the predefined time period is based on the behavior of the resources being enumerated.

12. The method of claim 8, wherein the enumeration does not require administrator-level access rights, and wherein enumerating of the resources comprises capturing live usage of an application running at the networked device.

13. One or more computer-readable storage media for device resource enumeration comprising a plurality of instructions that, when executed by a processor, cause the processor to:

enumerate resources, via an enumeration application, of a networked device without dependency on write permissions to a file system of the networked device, wherein the enumerated resources comprise at least one license associated with an installed software package and at least one class of enumeration information associated with a virtual machine;

generate a data object stored in a memory unit of the networked device based on the enumerated resources, wherein the generated object comprises a plurality of delimited sections represented in a single file;

compress the data object via a compression technique;

encrypt the compressed data object using synchronous encryption based on a dynamic key and an initialization vector, wherein the initialization vector is generated at run time of an encryption technique; and transmit the encrypted and compressed object to a destination device, wherein no two way communication is enabled for communication of the destination device back to the enumeration application.

14. The one or more computer-readable storage media of claim 13, wherein the enumeration does not require administrator-level access rights, and wherein enumerating of the resources comprises capturing live usage of an application running at the networked device.

15. The one or more computer-readable storage media of claim 13, wherein enumeration of the resources comprises capturing live usage of an application running at the networked device.

* * * * *